(12) United States Patent
Takeda et al.

(10) Patent No.: US 6,449,998 B1
(45) Date of Patent: *Sep. 17, 2002

(54) SHOT PEENING METHOD AND DEVICE THEREFOR

(75) Inventors: Hitoshi Takeda; Kunio Ohta; Hitoshi Rokutannda, all of Toyokawa (JP)

(73) Assignee: Sintokogio, Ltd., Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/937,134

(22) PCT Filed: Mar. 24, 2000

(86) PCT No.: PCT/JP00/01811
§ 371 (c)(1),
(2), (4) Date: Sep. 21, 2001

(87) PCT Pub. No.: WO00/56503
PCT Pub. Date: Sep. 28, 2000

(30) Foreign Application Priority Data

Mar. 24, 1999 (JP) .......................................... 11/079224
May 13, 1999 (JP) .......................................... 11/132199

(51) Int. Cl.[7] .............................. C21D 7/06; B21D 53/10
(52) U.S. Cl. ............................................ 72/53; 29/90.7
(58) Field of Search ................................ 72/53; 29/90.7

(56) References Cited

U.S. PATENT DOCUMENTS

| | | | | |
|---|---|---|---|---|
| 3,421,618 A | * | 1/1969 | Burney et al. ............. 209/44.2 |
| 4,714,622 A | * | 12/1987 | Omori et al. .................. 427/11 |
| 5,205,145 A | * | 4/1993 | Ishino et al. .................. 29/90.7 |
| 5,816,088 A | * | 10/1998 | Yamada et al. ............... 29/90.7 |
| 6,022,427 A | * | 2/2000 | Wienand et al. ............. 148/580 |
| 6,038,900 A | * | 3/2000 | Miyasaka .................... 29/90.7 |

FOREIGN PATENT DOCUMENTS

| JP | 60-96717 | | 5/1985 |
|---|---|---|---|
| JP | 60-150966 | | 8/1985 |
| JP | 61-265271 | | 11/1986 |
| JP | 4-193479 | * | 7/1992 |
| JP | 8-336757 | * | 12/1996 |
| JP | 63-256362 | * | 10/1998 |
| JP | 11-347944 | * | 12/1999 |

* cited by examiner

*Primary Examiner*—David Jones
(74) *Attorney, Agent, or Firm*—Finnegan, Henderson, Farabow, Garrett & Dunner LLP

(57) ABSTRACT

The present invention provides a method for a shot-peening processing that can process in one step and thus reduce operating costs and the cost of equipment while increasing the efficiency of the treatment in the peening processing while achieving a peening effect similar to the effect obtained by shot-peening processing a plural number of times, that is, deeply generating compressive residual stress far from the top surface while generating the peak value of the compressive residual stress on the top surface. This method is characterized by projecting, on a product to be subjected to peening, shot in which two or three kinds of particles, each having a different predetermined average particle diameter and having a predetermined average particle diameter ratio to one another, are combined in a predetermined weight ratio.

9 Claims, 6 Drawing Sheets

SHOT PEENING METHOD AND DEVICE THEREFOR

Field of the Invention

This invention relates to a method and device for effectively shot-peening curburized products such as gears, etc.

BACKGROUND OF THE INVENTION

Generally known has been a shot-peening processing in which particulate shot are projected on the surface of the part that receives the concentration of stress of the curburized products such as gears, etc., to increase the compressive residual stress and improve the fatigue strength. Japanese Patent Early-publication Nos. 60-150966 and 61-265271 suggest that a double shot-peening processing be conducted to increase the effect of a shot-peening processing.

In the double shot peening, at the first stage a deep (thick) compressive residual stress layer is formed in a product (the broken line in the graph of FIG. 2) by applying to a product a shot-peening processing with large-diameter particles, and at the second stage a high compressive residual stress is obtained in the top of the surface layer in the product by applying to the product to a shot-peening processing with small-diameter particles (the thick, continuous line in the graph of FIG. 2). By applying such a double shot-peening processing, a compressive residual stress as shown by the broken line in the graph of FIG. 1 is obtained.

However, since the above double shot-peening processing has two processing steps, it is time-consuming and thus the efficiency of processing worsens. Also, it requires equipment of two devices, one of which is used for projecting the large-diameter particles and the other of which is used for projecting the small-diameter particles. Thus it has a problem, in that the cost of equipment is high.

On the other hand, Japanese Patent Early-publication No. 60-96717 discloses an invention in which a shot peening is applied to the surface of a spring to generate compressive residual stress. Then a honing or sandblasting is applied to the surface to improve the surface roughness and increase the fatigue strength of the spring. However, this process also requires equipment of two devices. Thus the cost of equipment is high.

DISCLOSURE OF THE INVENTION

The present invention aims at providing a method and device for a shot-peening processing that can reduce operating costs and the cost of equipment while increasing the efficiency of treatment in the peening processing while achieving in a peening effect similar to the effect obtained by shot-peening processing plural times, that is, deeply generating compressive residual stress far from the top of the surface, while retaining the generation of the peak value of the compressive residual stress on the top of the surface.

The inventors of the present application extensively investigated to achieve the above object. As a result, they have found a method for shot-peening processing using shot in which two or three kinds of particles, each having an average particle diameter within the range of the predetermined average particle diameters, the ranges differing from one another, and having a predetermined average particle diameter ratio to one another, are combined in a predetermined weight ratio, and a device for conducting this method.

Method 1 of the present invention is characterized by projecting, on a product to be subjected to peening, shot in which large-diameter particles having an average particle diameter of 300–1,000 $\mu$m, and small-diameter particles having an average particle diameter of 20–300 $\mu$m, the ratio of the average particle diameter of said small-diameter particles to that of said large-diameter particles being 1/3–1/15, are combined in a weight ratio such that the coverage of each of the particles is 100% or more in the same projection time.

Method 2 of the present invention is characterized by projecting, on a product to be subjected to peening, shot in which large-diameter particles, having an average particle diameter of 500–1,000 $\mu$m, medium-diameter particles having an average particle diameter of 100–500 $\mu$m, and small-diameter particles having an average particle diameter of 20–100 $\mu$m, the ratio of the average particle diameter of said medium-diameter particles to that of said large-diameter particles and the ratio of the average particle diameter of said small-diameter particles to that of said medium-diameter particles each being 1/2–1/15, are combined in a ratio such that the coverage of each of the particles is 100% or more in the same projection time.

Also, the first device for a shot-peening processing to conduct the method of the present invention is characterized by connectively placing a classifying device at the bottom of a peening chamber provided with a projecting device at its top, by which classifying device shot that are worn and broken by their use into particles having a particle diameter other than the predetermined average particle diameters of the particles to be used are classified and removed while recycled shot are classified into particles of respective average particle diameters to be used (for above method 1, the large-diameter particles and the small-diameter particles, and for above method 2, the large-diameter particles, the medium-diameter particles, and the small-diameter particles), connectively joining the respective openings of the classifying device for discharging the large-diameter particles and the small-diameter particles to respective means for transferring shot, connecting the ends of the respective means for transferring shot to a tank for shot, in which tank a device for uniformly stirring and mixing is provided, and connectively joining the tank to the projecting device.

A second device for a shot-peening processing to conduct the method of the present invention is characterized by connectively placing a classifying device at the bottom of a peening chamber provided with a projecting device at its top, by which classifying device shot that are worn and broken by their use are classified into particles having particle diameters other than predetermined average particle diameters of the particles to be used and removed while recycled shot are classified into particles of respective average particle diameters to be used (for above method 1, the large-diameter particles and the small-diameter particles, and for above method 2, the large-diameter particles, the medium-diameter particles, and the small-diameter particles), connectively joining the respective openings of the classifying device for discharging particles of respective average particle diameters (for above method 1, the large-diameter particles and the small-diameter particles, and for above method 2, the large-diameter particles, the medium-diameter particles, and the small-diameter particles) to respective means for transferring shot, collectively connecting the ends of the respective means for transferring shot to respective supply pipes for the shot through respective flow control valves by which each flow rate is controlled to be at a predetermined weight ratio, and connectively joining the supply pipes to the projecting device.

PREFERRED EMBODIMENT FOR CARRYING OUT THE INVENTION

By projecting, on a product to be subjected to peening, shot in which large-diameter particles having an average particle diameter of 300–1,000 $\mu$m, and small-diameter particles having an average particle diameter of 20–300 $\mu$m, the ratio of the average particle diameter of said small-diameter particles to that of said large-diameter particles being 1/3–1/15, are combined in a weight ratio such that the coverage of each of the particles is 100% or more in the same projection time (method 1), peening processes can be conducted in one step while a peening effect is obtained equivalent to that obtained by a double peening processing in which the large-diameter particles and the small-diameter particles are separately projected. Thus this method can significantly increase the efficiency of treatment. Also, in this A method the equipment for peening processing can be that for conducting a one-step peening processing. Thus the cost of equipment can be significantly decreased.

By projecting, on a product to be subjected to peening, shot in which the large-diameter particles having an average particle diameter of 500–1,000 $\mu$m, the medium-diameter particles having an average particle diameter of 100–500 $\mu$m, and the small-diameter particles having an average particle diameter of 20 –100 $\mu$m, the ratio of the average particle diameter of said medium-diameter particles to that of said large-diameter particles and the ratio of the average particle diameter of said small-diameter particles to that of said medium-diameter particles being each 1/2–1/15, are combined in a ratio such that the coverage of each of the particles is 100% or more in the same projection time (method 2), the peening process can be conducted in one step, while a peening effect is obtained equivalent to that obtained by a triple peening processing in which the large-diameter particles, the medium-diameter particles, and the small-diameter particles are separately projected. That is, compressive residual stress is deeply generated far from the top of the surface, and the peak value of the compressive residual stress is generated on the top of the surface. Thus this method can significantly increase the efficiency of the treatment. Also, the equipment for peening processing can be that for conducting a one-step peening processing. Thus the cost of equipment can be significantly decreased.

From the results of various experiments, it was found that since the use of shot having an average particle diameter of less than 20 $\mu$m for the small-diameter particles has only a slight effect in peening processing, and the use of shot having an average particle diameter of more than 1,000 $\mu$m for large-diameter particles makes the surface roughness of products to be processed high and fatigue strength significantly low, average particle diameters of 20–1,000 $\mu$m are preferred for the scope of the application of the shot of the present invention.

Figure 5:
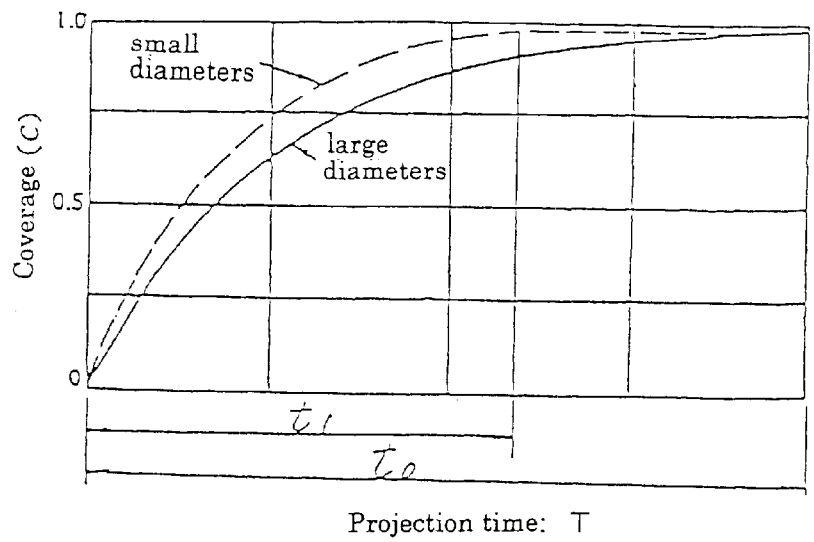
FIG. 5 is a graph representing an example of determining a coverage in a peening processing with the large-diameter particles and the small-diameter particles, both types of the particles of said average particle diameters being used in method 1 of the present invention.

For the method of determining the strength of shot-peening processing, the method of measuring area coverage (hereafter, "coverage") is generally utilized. This measurement of the coverage is obtained by calculating the ratio of the total of the areas of traces caused by the projection with shot to a processed area. For measuring the area coverage, there is a standard measurement method and a simplified measurement method. For the experiments of the present application it was determined by the simplified measurement method. This simplified measurement method is one that determines a coverage by comparing a photograph of a standard of which the coverage is already known by the standard measurement method with the surface of a specimen after processing. In FIG. 5 an example is shown of measuring the coverage by method 1 of the present invention. In that Figure the continuous line represents the characteristics of the coverage of the large-diameter particles and the broken line represents the characteristics of the coverage of the small-diameter particles. When the coverage by one-time peening is $C_1$, then $C_n=1-(1-C_1)$ "n" where "n" is the number of times of peening. The calculated value is to an extent of 98%, which is regarded as full coverage, and as 100%. Also, 300% of coverage is referred to as being in the state in which the time until the coverage reaches 100% is multiplied by three.

A first device for conducting a method of projecting, on a product to be subjected to peening, shot in which the large-diameter particles and the small-diameter particles are combined in a predetermined weight ratio, each of said large-diameter particles and small-diameter particles satisfying their respective requirements (method 1), is specifically explained below by referring to FIG. 6.

The bottom part of a peening chamber 2, to the top of which a projecting device 1 for shot is fixed, communicates with a classifying device 3 through a recycle pipe. By the classifying device 3, shot that are worn or broken into particles having an average particle diameter other than that of large-diameter particles or the small-diameter particles (particles intermediate between the large-diameter particles and the small-diameter particles, and fine powder smaller than the small-diameter particles) can be classified and subsequently recycled in recycle boxes 4A and 4B and removed while classifying the shot into the large-diameter particles and the small-diameter particles, which are subsequently delivered.

Openings 5A and 5B for discharging the large-diameter particles and the small-diameter particles, respectively, which are classified by the classifying device, communicate with a tank 8 for shot disposed above the projecting device 1 through a means 6 for transferring shot, constituted by a screw conveyor or bucket conveyor. In the tank 8 for shot a device 9 for a uniform stirring and mixing is provided. Also, the tank 8 for shot communicates with the projecting device 1.

In this device, shot in which the large-diameter particles and the small-diameter particles are combined in a predetermined weight ratio are supplied from the tank 8 for shot to the projecting device 1 by which the shot are projected toward a product W to be subjected to peening, which product W is revolved in the peening chamber 2 to apply peening processing. Since in the tank for shot they are retained such that the large-diameter particles and the small-diameter particles are segregated by their specific gravities, the device 9 for a uniform stirring and mixing is operated to uniformly stir and mix the shot to break up the segregation and then to supply the materials to the projecting device 1. Thus a peening processing is again conducted in a state such that satisfies predetermined processing conditions.

Figure 7:
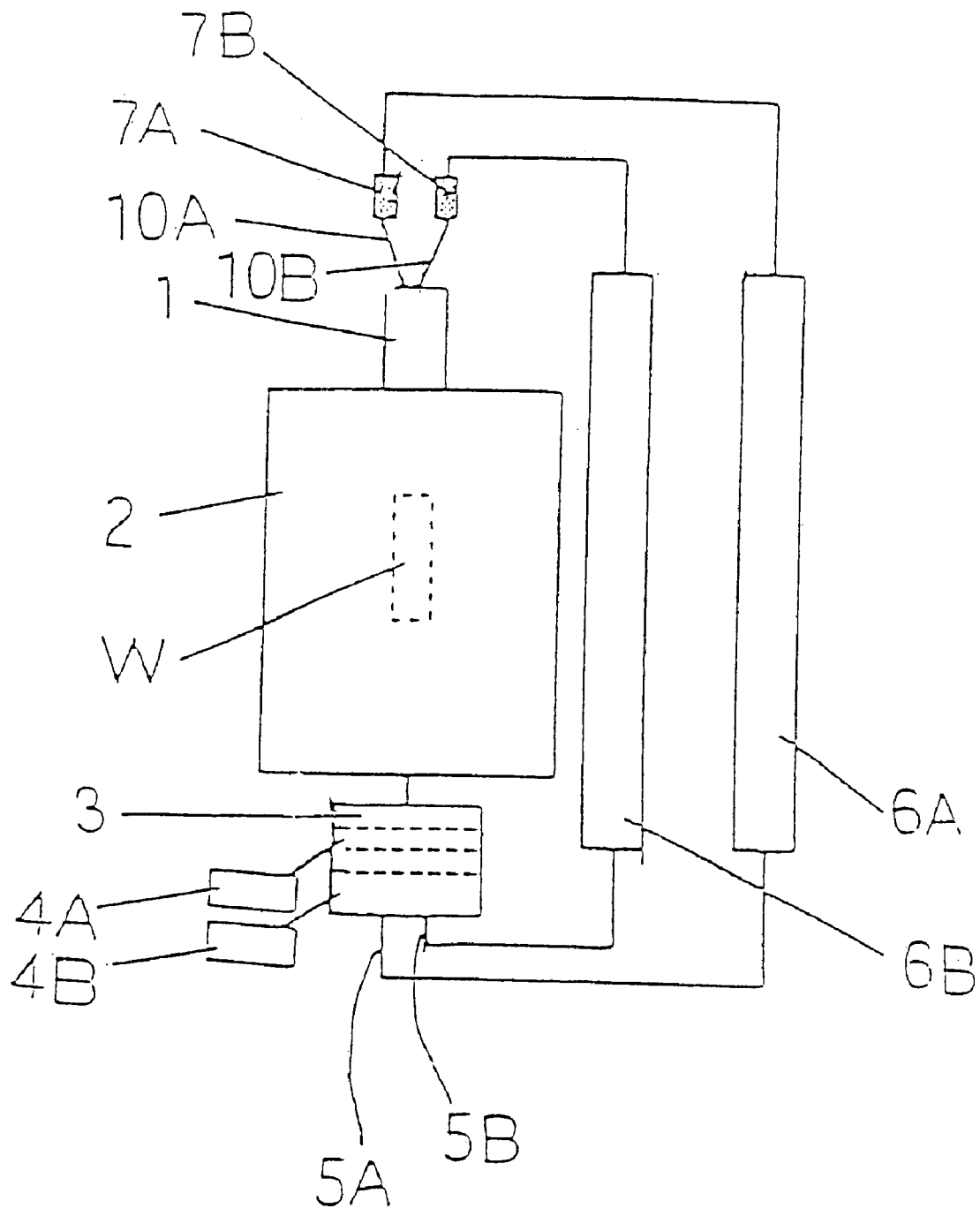
FIG. 7 is a constitutional drawing showing a second shot-peening processing to conduct method 1 of the present invention.

Next, similarly to the above, a device for a second shot-peening processing to conduct method 1 is specifically explained below by referring to FIG. 7.

Figure 6:
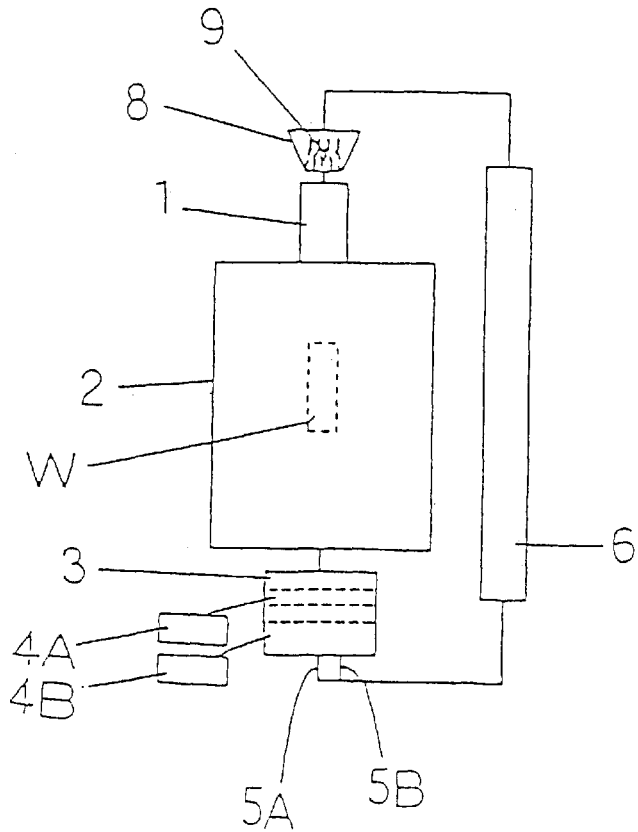
FIG. 6 is a constitutional drawing showing a first shot-peening processing device to conduct method 1 of the present invention.

A peening chamber 2, to the top of which a projecting device 1 is fixed, a classifying device 3, and recycle boxes 4A and 4B are composed as shown by FIG. 6. An opening 5A for discharging the large-diameter particles and an opening 5B for discharging the small-diameter particles of the classifying device 3 communicate with respective means 6A and 6B, respectively, for transferring shot, constituted by a screw conveyor or bucket conveyor. The end of each of the transferring means 6A and 6B communicates with the projecting device 1 through respective flow control valves 7A and 7B and respective supply pipes 10A and 10B for respective shot.

In this device, the large-diameter particles and the small-diameter particles are delivered in respective predetermined weights via respective flow control valves 7A and 7B of the large-diameter particles and the small-diameter particles to be controlled in a predetermined weight ratio, and are supplied through supply pipes 10A and 10B for shot to a projecting device 1 by which the shot are projected toward a product W to be subjected to peening, which product W is revolved in the peening chamber 2, to apply peening processing.

A first device for conducting a method of projecting, on a product to be subjected to peening, shot in which the large-diameter particles, the medium-diameter particles, and the small-diameter particles, each of the particles of said diameters satisfying their respective requirements, are combined in a predetermined weight ratio (method 2), is specifically explained below by referring to FIG. 8.

A peening chamber 2, to the top of which a projecting device 1 is fixed, a classifying device 3, and recycle boxes 4A and 4B are composed. By the classifying device 3, shot that are worn or broken by their use into particles having an average particle diameter other than that of the large-diameter particles, the medium-diameter particles, or the small-diameter particles (particles intermediate between the large-diameter particles and the small-diameter particles, particles intermediate between the medium-diameter particles and the small-diameter particles, and fine powders smaller than the small-diameter particles) are classified and are recycled in recycle boxes 4A, 4B, and 4C and removed while the recycled shot are classified into the large-diameter particles, the medium-diameter particles, and the small-diameter particles, each of which has a predetermined average particle diameter. Discharge openings 5A, 5B, and 5C, for the large-diameter particles, the medium-diameter particles, and the small-diameter particles, respectively, which are classified by the classifying device 3, communicate with a column of means 6 for transferring shot, constituted by a screw conveyor or bucket conveyor. The end of the transferring means 6 communicates with a tank 8 for shot placed above the projecting device. In the tank 8 for shot, a device 9 for a uniform stirring and mixing is installed. The lower end of the tank for shot communicates with the projecting device 1.

In this device, shot in which the large-diameter particles, the medium-diameter particles, and the small-diameter particles are combined in a predetermined weight ratio are supplied from the tank 8 for shot to a projecting device 1 by which the shot are projected toward a product W to be subjected to peening, which is revolved in the peening chamber 2, to apply peening processing. Since in the tank 8 for shot the shot are retained such that they are segregated by their specific gravities, the device 9 for a uniform stirring and mixing is made to operate to uniformly stir and mix the shot to break up the segregation. Then the shot are supplied to the projecting device 1. Thus peening processing is again conducted in a state such that predetermined processing conditions are satisfied.

Figure 9:
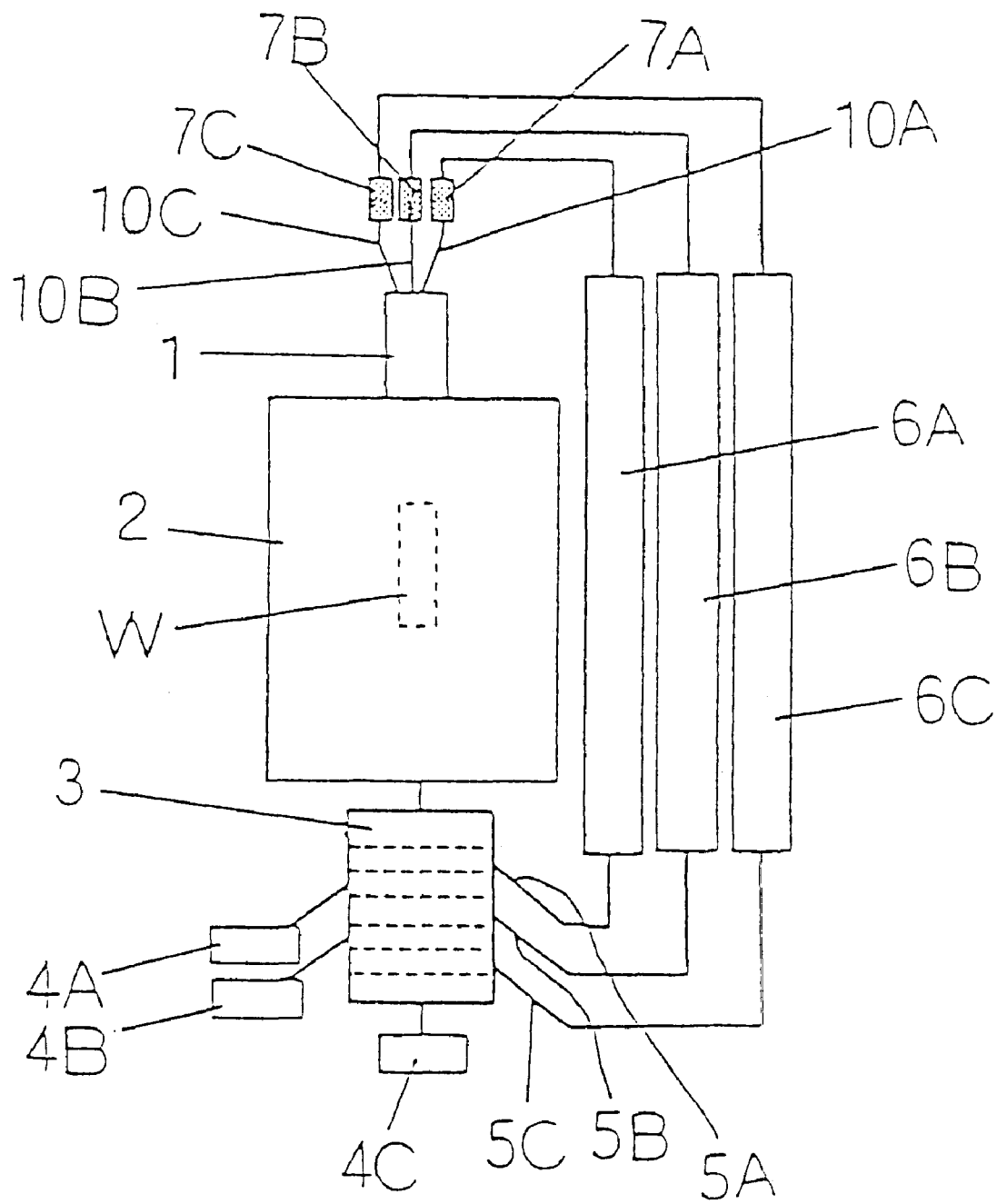
FIG. 9 is a constitutional drawing showing a second shot-peening processing device to conduct method 2 of the present invention.

Next, similarly to the above, a device for a second shot-peening processing to conduct method 2 is specifically explained below by referring to FIG. 9.

Figure 8:
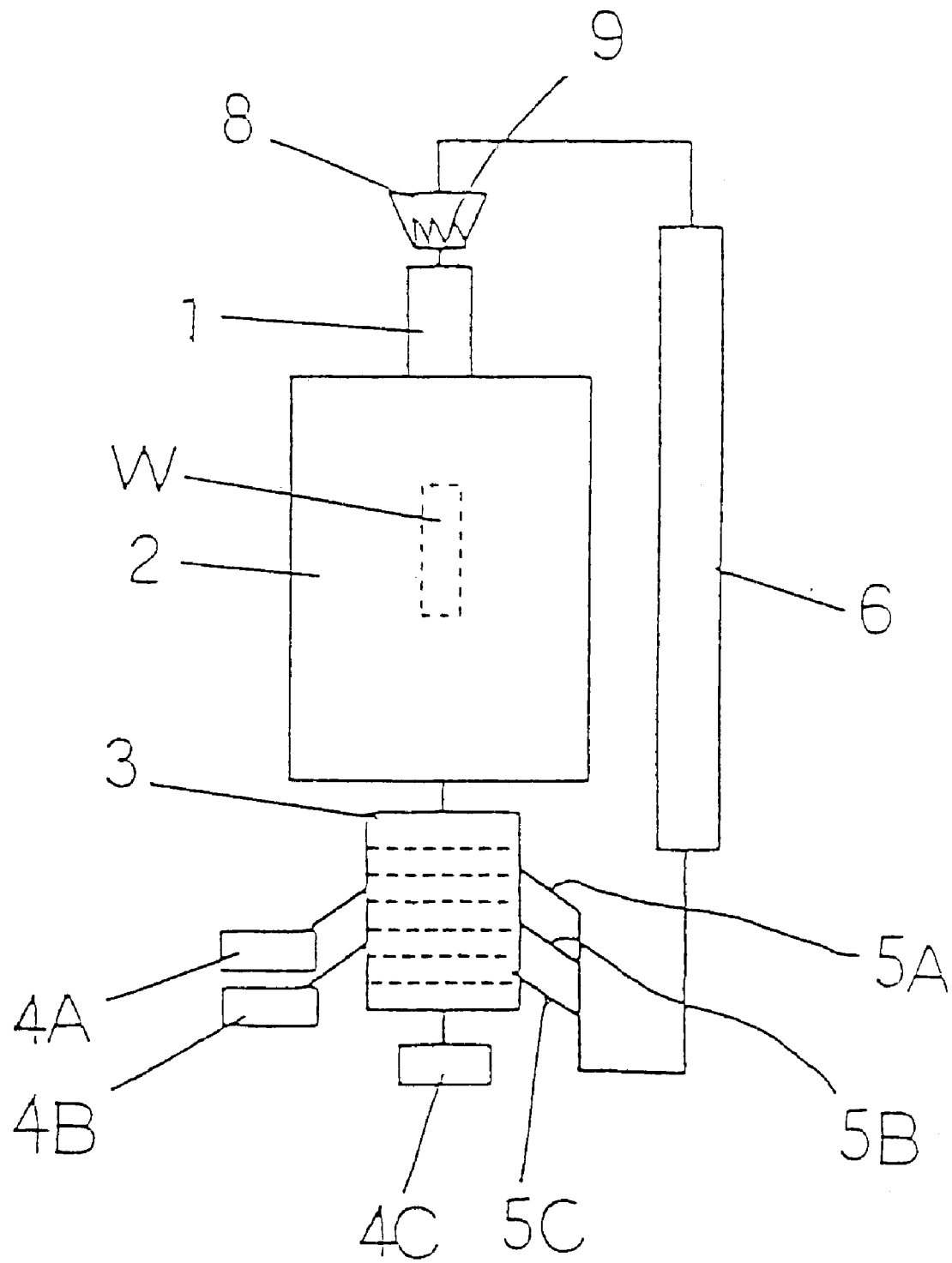
FIG. 8 is a constitutional drawing showing a first shot-peening processing device to conduct method 2 of the present invention.

A peening chamber 2, to the top of which a projecting device 1 is fixed, a classifying device 3, and recycle boxes 4A, 4B, and 4C are composed as shown by FIG. 8. An opening 5A for discharging the large-diameter particles, an opening 5B for discharging the medium-diameter particles, and an opening 5C for discharging small-diameter particles of the classifying device 3 communicate with a shot-transferring means 6A, 6B, and 6C, respectively, for transferring shot, constituted by a screw conveyor or bucket conveyor. The end of each of the transferring means 6A, 6B, and 6C communicates with the projecting device 1 through respective flow control valves 7A, 7B, and 7C and respective supply pipes 10A, 10B, and 10C for respective shot.

In this device, the large-diameter particles, the medium-diameter particles, and the small-diameter particles are delivered in respective predetermined weights via respective flow control valves 7A, 7B, and 7C for the large-diameter particles, the medium-diameter particles, and the small-diameter particles and in a controlled predetermined weight ratio, and are supplied through the supply pipes 10A, 10B, and 10C for shot to a projecting device 1 by which the shot are projected toward a product W to be subjected to peening, which is revolved in a peening chamber 2, to apply peening processing.

EXAMPLES

In the following Examples, as a product to be subjected to peening, a commercial gear of alloy steel to use for machine structure that has been treated with carburization is used. This gear has a diameter of 130 mm and a width of 15 mm, and a hardness of HV720–850.

Example 1

In this Example, an example in which the shot, in which the large-diameter particles and the small-diameter particles within the respective ranges of the predetermined average particle diameters were combined, are projected on a product to be subjected to peening, i.e., the gear (method 1 of the present invention), is given with a comparison to the case in which a double shot-peening processing is conducted.

The conditions for the peening processing on this gear are as shown by Table 1. As the shot, large-diameter particles A (an average particle diameter of 600 μm) and small-diameter particles B (an average particle diameter of 100 μm) were used. They were projected at a rate of 70 m/second for 28 seconds. For a double shot-peening, A was projected for 18 seconds and B was projected for 10 seconds.

TABLE 1

| Shot | A: diameter: 600 μm |
| --- | --- |
| | B: diameter: 100 μm |
| Amount projected | 170 kg/min. |
| Projection time | A: 18 sec. |
| | B: 10 sec. |
| | Double peening: 28 sec. |
| | Mixed peening: 28 sec. |
| Rate of projection | 70 m/sec. |
| Number of revolutions of product | 60 rpm |
| Coverage | 300% or more |

To equalize the projection energy to that given upon double shot-peening processing, a peening processing was conducted at a weight ratio of the large-diameter particles A to the small-diameter particles B used in this Example of 64.3 for A and 35.7 for B. Thus if the total projection time is 1, the ratio of A to B to be projected is 0.643 for A and 0.357 for B. In the present case, the coverage was set to be 300%, so that each of the conditions could be compared.

Figure 1:
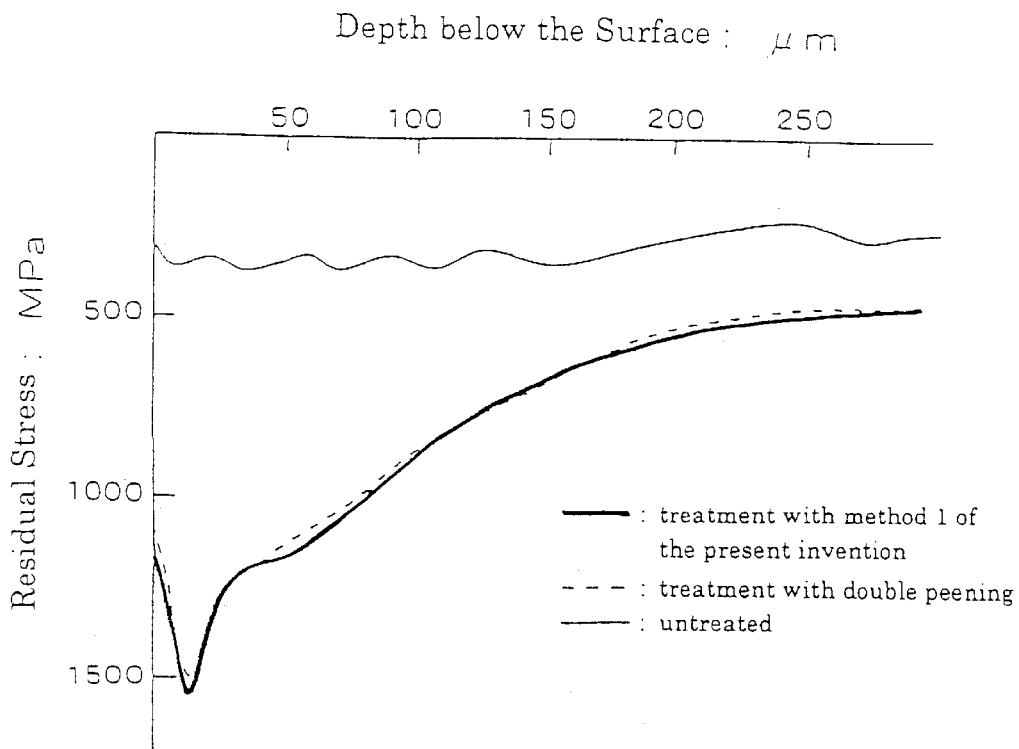
FIG. 1 is a graph representing the states of residual stress generated by conducting method 1 of the present invention and of the residual stress generated by the double peening processing.
Figure 2:
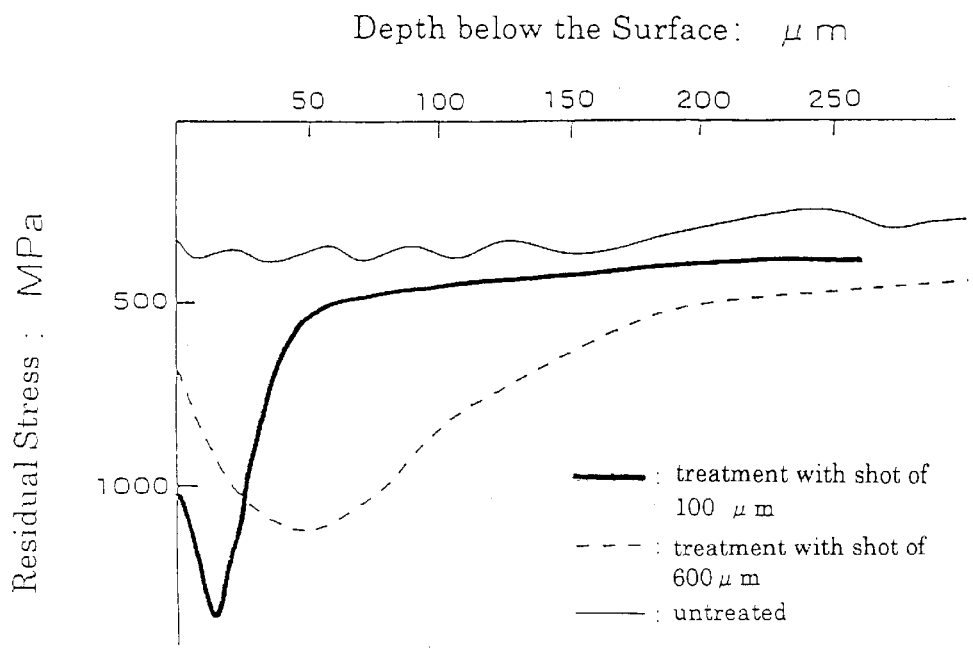
FIG. 2 is a graph representing a state of the residual stress generated by conducting respective peening processings with the large-diameter particles and the small-diameter particles, both types of said particles of respective particle diameters being used in method 1 of the present invention.

As shown by the thick continuous line in the graph of FIG. 1, in the gear processed with a shot-peening with method 1 of the present invention (using shot in which the large-diameter particles and the small diameter-particle were combined) the peak was observed of a compressive residual stress at the predetermined place in the direction of the depth from the surface of the product to be subjected to peening. Also, it was found that a compressive residual stress was generated to a depth of 100–150 μm from the surface (the thick continuous line in the graph of FIG. 1). It was also found that the properties were almost the same as those of the double shot-peening processed product (the broken line in the graph of FIG. 1).

Example 2

In this Example, an example in which shot in which the large-diameter particles, the medium-diameter particles and the small-diameter particles having respective average particle diameters within the respective ranges of predetermined average particle diameters were combined were projected on a product to be subjected to peening, i.e., said gear (method 2 of the present invention), is given with a comparison to the case in which a three-step shot-peening processing was conducted.

The conditions for the peening processing on this gear were as shown by Table 2. As the shot, large-diameter particles A (an average particle diameter of 800 μm), medium-diameter particles B (an average particle diameter of 250 μm), and small-diameter particles C (an average particle diameter of 40 μm) were used. They were projected at a rate of 70 m/second for 48 seconds. For the three-step shot-peening, the large-diameter particles A were projected for 20 seconds, B were projected for 12 seconds, and C were projected for 8 seconds).

TABLE 2

| Shot | A: diameter: 800 μm |
| --- | --- |
| | B: diameter: 250 μm |
| | C: diameter: 40 μm |
| Amount projected | 170 kg/min. |
| Projection time | A: 20 sec. |
| | B: 12 sec. |
| | C: 8 sec. |
| | Three-time peening: 40 sec. |
| | Mixed peening: 40 sec. |
| Rate of projection | 70 m/sec. |
| Number of revolutions of product | 60 rpm |
| Coverage | 300% or more |

When the total shot are regarded as 100, to equalize the projection energy to that given upon three-step shot-peening processing, a shot-peening processing was conducted with the large-diameter particles A of 50, the medium-diameter particles B of 30, and the small-diameter particles C of 20. Thus when the total projection time is regarded as 1, the weight ratio of the shot to be projected was 0.5 for A, 0.3 for B, and 0.2 for C. In the present case, the coverage was set to be 300%, so that each of the conditions could be compared.

Figure 3:
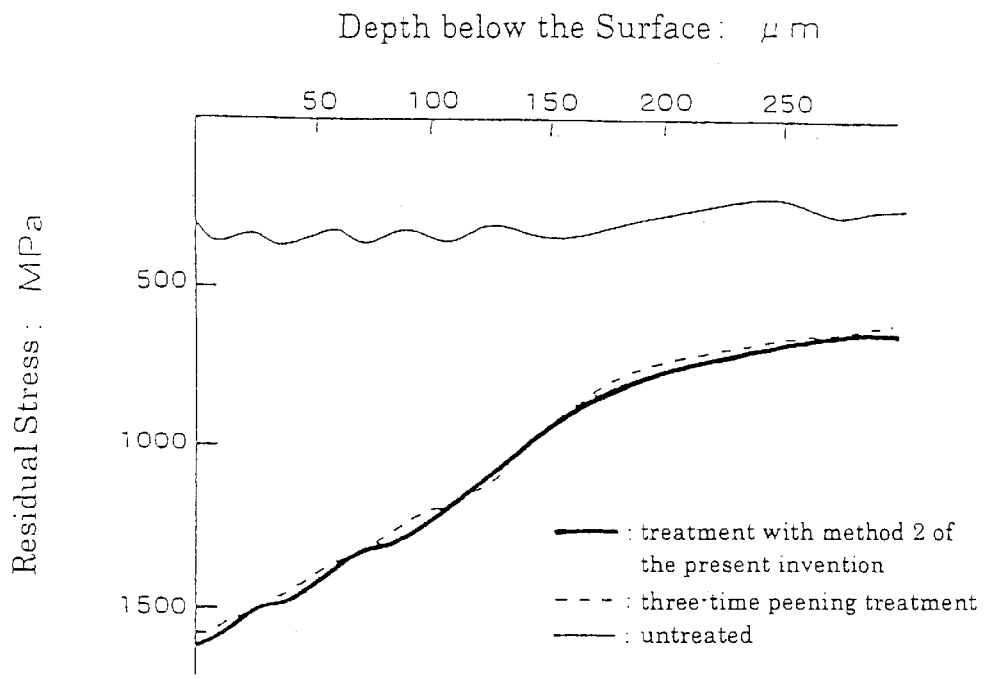
FIG. 3 is a graph representing the states of the residual stress generated by conducting method 2 of the present invention and of the residual stress generated by the three-step peening processing.
Figure 4:
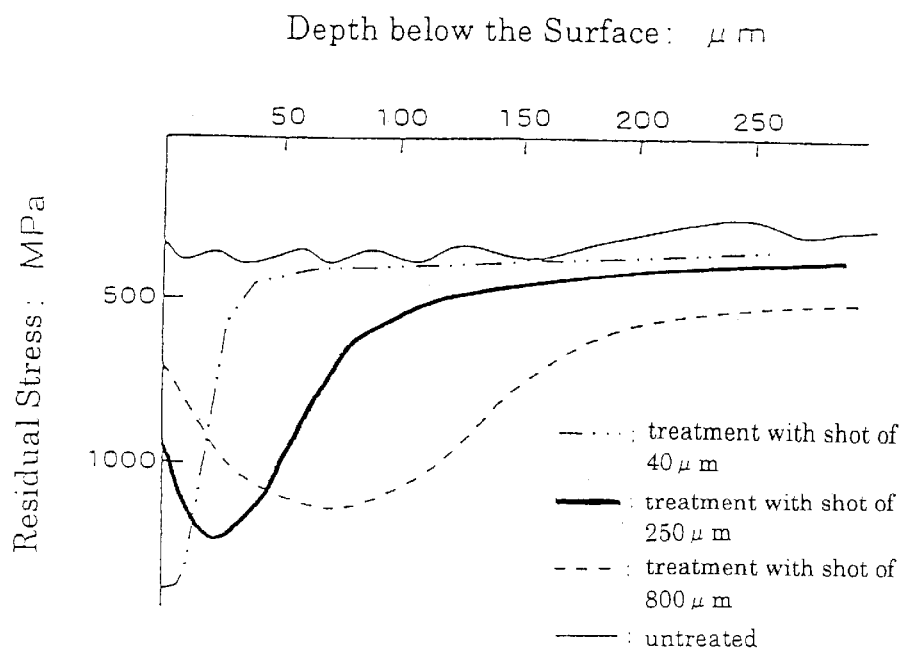
FIG. 4 is a graph representing a state of residual stress generated by conducting a respective peening processing with the large-diameter particles, the medium-diameter particles, and the small-diameter particles, all types of the particles of said average particle diameters being used in method 2 of the present invention.

As shown by the thick continuous line in the graph of FIG. 3, in the gear processed by a shot-peening with method 2 of the present invention (using shot in which the large-diameter particles, the medium-diameter particles, and the small-diameter particles were combined) the peak was observed of a compressive residual stress at almost the top of the surface of the product subjected to peening. Also, it was found that a compressive residual stress was generated to 250–300 μm from the surface. It was also found that the properties were almost the same as those of the three-step shot-peening processed product (the broken line in the graph of FIG. 3).

What is claimed is:

1. A method for shot-peening the surface of a product, comprising combining in a predetermined weight ratio large-diameter particles having an average particle diameter in the range of 300 to 1,000 μm and small-diameter particles having an average particle diameter in the range of 20 to 300 μm to form combined particulate shot, providing a ratio of the average particle diameter of said small-diameter particles to the average particle diameter of said large-diameter particles in the range of 1/3 to 1/15, shot-peening the surface of the product by projecting the combined particulate shot upon the surface of the product, and obtaining during the shot-peening process by the predetermination of the weight ratio of large-diameter particles to small-diameter particles an area of coverage of the surface of the product by each of the large-diameter particles and small-diameter particles of at least 100%, said shot-peening generating compressive residual stress at the surface of the product and in a deep layer below the surface of the product.

2. The method for shot-peening as claimed in claim 1, further comprising recycling the combined particulate shot after the shot-peening step including removing particulates that are worn and particulates that have been broken where the diameters are outside of said ranges of particle diameters of the large-diameter particles and the small-diameter particles, separating the residual shot into the large-diameter and the small-diameter particles, combining again the large-diameter particles and the small-diameter particles to form combined particulate shot, uniformly mixing the combined particulate shot, and projecting again the combined particulate shot upon the surface of the product.

3. The method for shot-peening as claimed in claim 2, further comprising rotating the product during the shot-peening step.

4. The method for shot-peening as claimed in claim 2, further comprising transporting the combined particulate shot to a tank where the mixing step occurs, and stirring while mixing the combined particulate shot.

5. The method for shot-peening as claimed in claim 1, further comprising recycling the combined particulate shot after the shot-peening step including classifying and removing particulates that are worn and particulates that have been broken where the diameters are outside of said ranges of particle diameters of the large-diameter particles and the small-diameter particles, separating the residual shot into the large-diameter particles and the small-diameter particles, separately transferring to respective flow-control valves the large-diameter particles and the small-diameter particles, combining again the separately transferred large-diameter particles and small-diameter particles in the predetermined weight ratio under control of the respective flow control valves, and reprojecting the recycled, residual, combined particulate shot upon the surface of the product.

6. A method for shot-peening the surface of a product, comprising combining in a predetermined weight ratio large-diameter particles having an average particle diameter in the range of 500 to 1,000 μm, medium-diameter particles having an average particle diameter in the range of 100 to 500 μm, and small-diameter particles having an average particle diameter in the range of 20 to 100 μm to form combined particulate shot, providing a ratio of the average particle diameter of said medium-diameter particles to the average particle diameter of said large-diameter particles and a ratio of the average particle diameter of said small-diameter particles to the average particle diameter of said medium-diameter particles both in the range of 1/3 to 1/15, shot-peening the surface of the product by projecting the combined particulate shot upon the surface of the product and obtaining during the shot-peening process by said predetermination of the weight ratio an area of coverage of the surface of the product by each of the large-diameter particles, the medium-diameter particles and the small-diameter particles of at least 100%, said shot-peening generating compressive residual stress at the surface of the product and in a deep layer below the surface of the product.

7. The method for shot-peening as claimed in claim 6, further comprising recycling the combined particulate shot after the shot-peening step, including removing particulates that are worn and particulates that have been broken whose diameters are outside of said ranges of particle diameters of the large-diameter particles, the medium-diameter particles, and the small-diameter particles, separating the residual shot into the large-diameter particles, the medium-diameter particles, and the small-diameter particles, combining again the large-diameter particles, the medium-diameter particles, and the small-diameter particles to form combined particulate shot, uniformly mixing the combined particulate shot, and projecting again the combined particulate shot upon the surface of the product.

8. The method for shot-peening as claimed in claim 6, further comprising recycling the combined particulate shot after the shot-peening step and removing particulates that are worn and particulates that have been broken where the diameters are outside of said ranges of particle diameters of the large-diameter particles, the medium-diameter particles, and the small-diameter particles, separating the residual shot into the large-diameter particles, the medium-diameter particles, and the small-diameter particles, separately transferring to respective flow control valves the large-diameter particles, the medium-diameter particles, and the small-diameter particles, combining again the separately transferred large-diameter particles, medium-diameter particles, and small-diameter particles in the predetermined weight ratio under control of the respective flow control valves, and reprojecting the recycled, residual, combined particulate shot upon the surface of the product.

9. A device for a shot-peening the surface of a product with shot having large-diameter and small-diameter particles, comprising a peening chamber having at its top a projecting device for shot, a shot-classifying device connected to the bottom of the peening chamber for classifying and removing shot that is worn or broken into particles having particle diameters outside of preselected respective ranges of average particle diameters for the large-diameter particles and small-diameter particles a n d for dividing the residual shot into large-diameter particles and small-diameter particles having the aforesaid preselected respective ranges of average particle diameters, discharge openings on the shot-classifying device for discharging respectively the large-diameter particles and the small-diameter particles, flow control valves, conveyors communicating with the discharge openings for transferring respectively the discharged large-diameter particles and small-diameter particles to respective flow control valves, and supply pipes connected between the flow control valves and the projecting device to provide respectively the large-diameter particles and the small-diameter particles to the projecting device.

* * * * *